United States Patent
Wiesmann et al.

(10) Patent No.: US 7,376,310 B2
(45) Date of Patent: May 20, 2008

(54) OPTICAL WAVEGUIDE ELEMENT WITH CONTROLLED BIREFRINGENCE

(75) Inventors: Dorothea Wiesmann, Zurich (CH); Bert Offrein, Langnau Am Albis (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/736,141

(22) Filed: Dec. 15, 2003

(65) Prior Publication Data

US 2004/0141691 A1 Jul. 22, 2004

(30) Foreign Application Priority Data

Dec. 20, 2002 (EP) .................. 02028544

(51) Int. Cl.
*G02B 6/26* (2006.01)
*G02B 6/42* (2006.01)

(52) U.S. Cl. .................. 385/40; 385/1; 385/2; 385/3; 385/39

(58) Field of Classification Search .................. 385/1–3, 385/8, 9, 39–42, 45, 140
See application file for complete search history.

(56) References Cited

U.S. PATENT DOCUMENTS

| | | | |
|---|---|---|---|
| 4,781,424 A | 11/1988 | Kawachi | 385/132 |
| 4,900,112 A | 2/1990 | Kawachi et al. | 385/14 |
| 5,117,470 A * | 5/1992 | Inoue et al. | 385/14 |
| 6,240,221 B1 * | 5/2001 | Thompson | 385/14 |
| 2002/0126933 A1 * | 9/2002 | Goh et al. | 385/2 |

* cited by examiner

*Primary Examiner*—Frank G. Font
*Assistant Examiner*—Derek L. Dupuis
(74) *Attorney, Agent, or Firm*—Richard M. Goldman

(57) ABSTRACT

An optical waveguide element having a cladding layer formed on a substrate and at least one waveguide core formed in the cladding layer for transmitting an optical signal. Two heater sections are provided for shifting a phase of optical signals. The two heater sections show different design. This helps controlling heater induced birefringence.

12 Claims, 6 Drawing Sheets

OPTICAL WAVEGUIDE ELEMENT WITH CONTROLLED BIREFRINGENCE

TECHNICAL FIELD

The present invention relates to an optical waveguide element.

BACKGROUND OF THE INVENTION

An optical waveguide element typically comprises at least a substrate, a cladding layer formed on the substrate, and a waveguide—also called waveguide core—formed in the cladding layer for transmitting an optical signal. Such waveguide elements are also called integrated optical devices or opto-electronic integrated circuits.

Cladding layer, waveguide and substrate typically show different thermal expansion coefficients since different materials are used. While fabricating waveguide elements, the elements are exposed to high temperatures. These high temperatures cause stress in the waveguide element due to the mentioned different thermal expansion coefficients. This stress in turn induces birefringence which basically means that TE and TM waves of transmitted optical signals show different behaviour. As a consequence, birefringence is one of the factors limiting the performance of a waveguide element.

Birefringence B can generally be defined as $B = \eta_{TM} - \eta_{TE}$, wherein $\eta_{TE}$ is the effective refractive index of a TE polarized wave and $\eta_{TM}$ is the effective refractive index of a TM polarized wave. A TE wave is a linearly polarized wave having an electric field direction in parallel with the major surface of the substrate. A TM wave is a linearly polarized wave having an electric field direction perpendicular to the major surface of the substrate. In other words, the perpendicular to the major surface of the substrate. In other words, the refractive indexes differ from one and another by B depending on the polarization direction of the incident light.

U.S. Pat. No. 4,781,424 addresses the problem of birefringence that is induced when manufacturing a waveguide element. U.S. Pat. No. 4,781,424 proposes to provide a stress adjusting means in the cladding layer for adjusting a stress applied to the waveguide. Such means might be an elongated member which is embedded in the cladding layer and may be composed of a material having a thermal expansion coefficient that is different from the one of the cladding layer. Alternatively, the stress adjusting means might be a groove provided in the cladding layer for relieving stress.

U.S. Pat. No. 4,900,112 discloses a single-mode optical waveguide element comprising a substrate, a cladding layer disposed on the substrate and a waveguide embedded in the cladding layer. A stress applying film in form of an amorphous silicon film is disposed on a desired portion of the cladding layer for adjusting stress induced birefringence by changing the stress exerted on the waveguide by a trimming technique. The stress applying film is trimmed by partially irradiating a light beam on it. The stress is changed irreversibly.

U.S. Pat. No. 5,117,470 discloses a method for adjusting a refractive index difference between a cladding layer and a waveguide core of an optical waveguide element by means of producing a reversible thermal hysteresis phenomenon. The thermal hysteresis is evoked by raising temperature in a predefined region of the waveguide element to a predefined level, maintaining the predefined temperature for a predetermined period of time, and cooling the region at a predetermined cooling rate. This method is carried out in order to change a coupling ratio of an optical coupler.

An optical waveguide element made in thin-film technology often comprises an optical phase shifting means. A heater can serve as such phase shifting means acting on an optical signal that is guided by means of a waveguide in accordance with the thermo-optical effect, such that refraction $\eta = \eta(T)$, with T as temperature.

In particular, an optical waveguide element can comprise two waveguides. A phase shifting means is applied to one of the waveguide cores for adjusting a phase of an optical signal in this waveguide relative to a phase of an optical signal guided in the other waveguide. When such optical signals are interfered—e.g. by means of an optical coupler—, an intensity modulated signal can be attained. Such an optical waveguide element can be used in variable optical attenuators, optical ring resonators, dispersion compensating devices, Mach-Zehnder interferometers, add-drop multiplexers, optical wavelength converters or amplitude-shift keying (ASK) as well as phase-shift keying (PSK) modulators operating particularly in low wavelength regions.

FIG. 1 shows a known waveguide element having a first and a second waveguide 3, 4 aligned in parallel, and having a first and a second optical coupler 301, 302, through which optical signals can be exchanged between the waveguides 3 and 4, and with a thin-film heater 100 covering a part of the first waveguide 3 and lying between the couplers 301, 302. An optical signal entering the first waveguide 3 at port A—indicated with an arrow—will partially be coupled from the first optical coupler 302 to the second waveguide 4. Between the directional optical couplers 301, 302, the phase of the remainder of the optical signal transferred in the first waveguide 3 will be shifted according to the thermal energy applied to the first waveguide 3 by means of the thin-film heater 100. The optical signal in the first waveguide 3 then interferes in the second coupler 302 with the optical signal of the second waveguide 4. Depending on the phase relationship between the optical signals in the waveguide sections before the coupler 302 the signal intensity in the second waveguide 4 at port D will be increased or reduced accordingly.

In order to obtain a desired shift of the phase of the optical signal in the first waveguide 3 relative to the phase of the optical signal in the second waveguide 4, thermal energy provided by the thin-film heater 100 is applied to the first waveguide 3. In the region of the thin-film heater 100, the waveguides 3, 4 are spaced apart at a distance which is sufficient to avoid a transfer of thermal energy from the thin-film heater 100 to the second waveguide 4. Thermal energy provided by the thin-film heater 100 is absorbed by a substrate 5 acting as a heat sink in such a way that the thin-film heater 100 forces a temperature gradient with respect to the substrate 5. The waveguide element according to FIG. 1 can be derived from U.S. Pat. No. 4,781,424.

Since the signal intensity in the waveguides 3 and 4 at ports C and D can vary depending on the phase relationship between the optical signals before being coupled in coupler 302, an optical waveguide element according to FIG. 1 can be used as variable optical attenuator (VOA), where constructive and/or destructive interference in the second coupler determines intensities of optical signals at the outputs of the second coupler.

Hence, thermo-optic control of a phase shift is an elegant way to realize adaptive devices in silica-on-silicon waveguide technology. A millisecond time response of the thermo-optic effect enables routing and compensation applications.

However, applicant detected some undesired polarization effects caused by such phase shifting heaters: Heating a section of a waveguide in order to obtain a phase shift causes a different phase shift efficiency for TE and TM polarized light. Local heating causes asymmetrical stress in the waveguide core. In addition, simply the presence of a heater—typically a thin film heater disposed on the top of the cladding layer—causes at least some birefringence due to its asymmetric arrangement with regard to the waveguide core.

Thus, a phase shift serving heater does not affect TE and TM waves of an optical signal in the same way due to an elasto-optical effect. As a result, the optical waveguide element cannot fulfill its task predictably, unless the polarization direction of an optical signal is previously adjusted to either a direction parallel or a direction vertical to the surface of the substrate, i.e. the input polarization with regard to the heater is not either being a linear TB or a linear TM wave.

With regard to an optical variable attenuator, a polarization-dependent loss (PDL) can be detected at the device's output that amounts to at least 0.25 dB for an attenuation of −15 dB.

It would therefore be desirable to create an optical waveguide element showing controllable phase shifting properties with regard to TE and TM waves. It would further be desirable to have a waveguide element operating with high efficiency.

SUMMARY OF THE INVENTION

According to an aspect of the present invention, there is provided an optical waveguide element, comprising a cladding layer formed on a substrate, two optical waveguides formed in the cladding layer, and two optical couplers being interconnected by the two waveguides. In addition, there is provided a first heater section comprising a first heater acting on one of the waveguides for shifting a phase of an optical signal that is transmitted via this waveguide, and a second heater section comprising a second heater acting on one of the waveguides for shifting a phase of an optical signal that is transmitted via this waveguide. The first and the second heater sections show different designs.

According to another aspect of the invention, there is provided an optical waveguide element, comprising a cladding layer formed on a substrate and a waveguide core formed in the cladding layer for transmitting an optical signal. A first heater section of the waveguide element comprises a first heater for shifting a phase of the optical signal. A second heater section of the waveguide element comprises a second heater for shifting a phase of the optical signal. The design of the first heater section is different than the design of the second heater section.

In both aspects of the invention, the design of a heater section comprises the design of the heater itself and/or the design of its surrounding area that might also have impact on birefringence properties.

Based on the awareness that a phase shifting heater can induce birefringence in a waveguide core when radiating heat and based on the awareness that induced birefringence is basically subject to geometry of a heater section, heater geometry or heater material, the idea is to split the phase shifting task and make at least two heaters perform the phase shifting task. On the other hand, both heater sections now induce birefringence. However, overall induced birefringence can now be controlled, adjusted or balanced, since birefringence induced in the first heater section can be controlled, adjusted or balanced by birefringence induced in the second heater section.

Thus, polarization effects and as a consequence birefringence of an output signal can be controlled or adjusted or balanced with a high degree of accuracy. A desired polarization dependence or independence can now be actively tuned, e.g. transmission phase of TE and TM waves can be adjusted such that they coincide or show another constant phase difference.

But not only birefringence caused by the first heater section can be balanced or controlled: Even birefringence induced in other pre connected optical sections—such as coupler sections or delay line sections—can be controlled or balanced by means of the second heater section.

There are two basic aspects based on the common idea of introducing a second heater section in order to control overall birefringence while sharing the phase shifting task amongst at least two heater sections.

According to the first aspect of the invention, optical signals provided from two waveguide cores are coupled—i.e. constructively or destructively interfered—by means of an optical coupler. By coupling the two optical signals, birefringence properties are also coupled and overall birefringence can for instance be raised. Hence, when at least one heater is acting on each waveguide according to an embodiment of the invention, both of these heater sections might cause birefringence having the same sign. At the output of the second coupler overall birefringence can then for instance be adjusted to zero when the two optical signals are interfered as function of the phase differences by means of the second coupler, provided that birefringence induced in each optical path has the same sign and the same amount.

Since a phase shifting effect is appreciated, heater section design of the two heater sections has to be different. For example, the first heater section can be designed such that a high positive birefringence value is induced while radiating only a small amount of heat at the same time and thus consuming only little electrical power for causing a high positive birefringence value. The second heater section can be designed such that a high positive birefringence value is achieved when supplying a lot of electrical power and thus radiating a big amount of heat. As a consequence, the second heater section might be operated with high power and thus be responsible for a major portion of phase shifting in the second waveguide branch which has a major impact on the intensity modulated output signal of the second coupler, while the first heater is operated with small power resources and thus causing a small contribution to phase shifting in the first waveguide branch and having minor impact on the intensity modulated output signal of the second coupler. Nevertheless, both heaters can be operated such that they induce the same amount of birefringence in their respective waveguide branches, which is eliminated by the coupler's subtracting properties.

The second aspect of the invention covers waveguide elements where birefringence can be controlled locally in a branch of a waveguide that is exposed to thermo-optical tuning elements. Heater sections showing different designs permit controlling, adjusting or balancing overall birefringence while performing phase shifting tasks.

In a preferred embodiment hereto, the second heater section is designed for inducing birefringence with an opposite sign than the birefringence that is evoked in the first heater section. Thereby, the opposite sign of the birefringence induced in the second heater section enables balancing.

In general, no significant additional power is consumed since the induced phase changes caused by the two heaters actually add. Also, only little extra real estate and little extra complexity has to be spent. The amount of balancing is also subject to heat radiated from the heaters and thus to electrical power supplied to the second heater.

When using the proposed waveguide element within a variable optical attenuator, polarization-dependent loss can now be controlled independently of the attenuation ratio.

Dependent claims cover embodiments of both aspects of the present invention and focus on realization of heater sections showing different design, such that induced polarization effects can be controlled or balanced.

These dependent claims are based on the insight that 1) for small electrode widths, the induced stress field is primarily vertical and affects most strongly the TM mode which results in a positive HIB (heater section induced birefringence—a definition of HIB will be introduced in the detailed description of the drawings). For wider heaters, at the position of the waveguide one has a more homogeneous stress distribution in the vertical direction, and the major stress is in the horizontal plane, affecting mostly the TE mode which results in a negative HIB. This would, for very broad heaters, lead to a fixed HIB value which then depends solely on the heater expansion coefficient and heater thickness, i.e. its specific force.

2) the thicker the heater, the stronger the force on the cladding layer and the larger the min-max HIB difference are as a function of the heater width.

3) the higher the expansion coefficient of the metal, the larger the min-max HIB difference is as a function of heater width due to the stronger force from the metal to the cladding layer.

In another two aspects of the present invention, there are provided optical waveguides that are in accordance with the first two aspects introduced above, but where phase shifting means are not limited to heaters. Electrodes causing phase shifting effects in optical signals based on an electro-optical effect can be used instead of heaters, when modifying the material of the waveguide core and the cladding layer accordingly, such that an electro-optical effect can be realized. All embodiments of the heater based waveguide elements are also applicable, preferred, and introduced herewith.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

Different figures may contain identical references, representing elements with similar or uniform content.

DETAILED DESCRIPTION OF THE INVENTION

Figure 2:
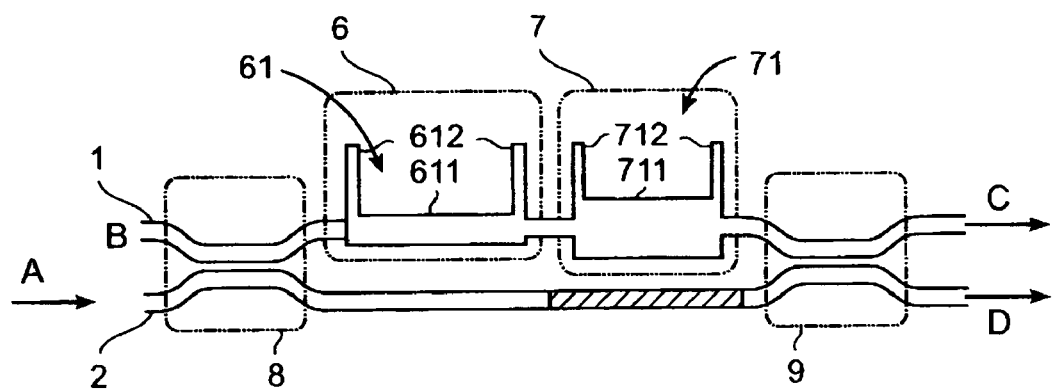
FIG. 2 an intensity coupler, in accordance with an embodiment of the present invention, FIG. 3 charts, showing TE and TM responses at the output of an variable optical attenuator, the variable optical attenuator having no balancing means in FIG. 3a), and including balancing means in FIG. 3b), FIG. 4 a perspective view of an optical waveguide element heater section for illustrating dimensions, FIG. 5 to FIG. 9 charts showing heater section induced birefringence as a function of different parameters, and FIG. 10 a perspective view of an optical waveguide element, in accordance with an embodiment of the present invention.

FIG. 2 shows a schematic top view of an intensity coupler used as a variable optical attenuator, in accordance with an embodiment of the present invention. A first and a second waveguide core are shown by reference 1 and 2. The waveguide cores 1 and 2 are embedded in a cladding layer that is not shown explicitly in FIG. 2. The cladding layer is disposed on a substrate indicated by reference 5. The substrate 5 is preferably a silica or silicon substrate, the cladding layer comprises preferably silica based glass, and the wave guide cores 1 and 2 preferably comprise SiON material.

A first and a second directional coupler 8 and 9 are introduced, through which optical signals can be exchanged between the waveguide cores 1, 2.

Two thin-film heaters 61 and 71 cover a part of the first waveguide core 1 and are arranged between the directional couplers 8, 9. Each thin-film heater 61, 71 is located on top of the cladding layer and in vicinity to the waveguide core 1 in order to act on and heat the waveguide core 1 and thus cause phase shifts in an optical signal guided in the waveguide core 1. Each thin-film heater 61, 71 comprises an electrode 611, 711, and terminals 612, 712 for electrical power supply.

An optical signal entering the second waveguide core 2 at port A—indicated with an arrow—will partially be coupled from the first directional coupler 8 to the first waveguide core 1. Between the directional couplers 8, 9, the phase of the optical signal transferred in the first waveguide core 1 is shifted according to the thermal energy applied to the first waveguide core 1 by means of the thin-film heaters 61 and 71. Thermal energy provided by the thin-film heaters 61 and 71 is absorbed by a substrate 5 acting as a heat sink in such a way that the thin-film heater 61 and 71 forces a temperature gradient with respect to the substrate 5.

The phase shifts induced by heaters 61 and 71 actually add. The optical signal in the first waveguide core 1 then interferes in the second directional coupler 9 with the optical signal of the second waveguide core 2. Depending on the phase relationship between the optical signals in the waveguide sections before the coupler 9, the signal intensity at output ports C and D of directional coupler 9 will be increased or reduced accordingly. Hence, the intensities of optical signals at output ports C and D are subject to heating energy supplied to heaters 61 and 71. Therefore, attenuation can be adjusted accordingly.

A thermo-optic phase shift originates from a refractive index change with temperature of the waveguide core and cladding layer material. For SiON waveguide cores the thermo-optic coefficient is about equal to that of silica ($10^{-5}$ °$C^{-1}$). When local temperature increases of about 100° C., an effective thermo-optic refractive index change is in the order of $10^{-3}$. Thermally induced stresses introduce additional refractive changes described by an elasto-optical tensor and a stress field. The elasto-optical coefficient of silica is about $5 \times 10^{-6}$. To obtain an indication of the stresses in the waveguide layer, a temperature change of about 100° C. leads to a stress of 30 MPa caused by the different expansion coefficients of silicon and glass. Hence, the stress induced birefringence is about $1.5 \times 10^{-4}$. This simplistic view already shows that the stress induced index change can not be neglected compared to the purely thermo-optical effect. Hence, the heater tuning can introduce significant polarization effects. Birefringence in turn causes a deviation in the phase of the optical signal. As a result, the optical waveguide element cannot fulfill its task, unless the polarization direction of an optical signal is previously adjusted to either a direction parallel or a direction vertical to the surface of the substrate.

Thus, waveguide element according to FIG. 2 introduces means for balancing birefringence induced in heater section 6. This means basically is heater section 7 comprising in particular heater geometry, heater material and heater section geometry which includes geometrical arrangements close to the heater and acting on birefringence, e.g. trenches next to the heater, since birefringence caused by a phase shifting heater is not only subject to heating power but also subject to these enumerated parameters. Assume that heater section 6 typically induces birefringence with a positive sign, heater section 7 is designed such that heater section induced birefringence is basically negative. The design of the two heater sections 6 and 7 is different with regard to the heater width wherein electrode 711 of heater 71 is wider than electrode 611 of heater 61. The width of an electrode is understood as its extension perpendicular to the longitudinal waveguide axis in a plane parallel to the surface of the substrate.

Heater (section) induced birefringence HIB is defined as HIB=$\Delta P_{TM-TE}$/P, which is the difference of electrical power $\Delta P_{TM-TE}$ that is needed for causing a phase shift in the optical signal of $2\pi$ for TM and TE waves, in relation to an average electrical power P that is needed for causing a phase shift in the optical signal of $2\pi$. It is assumed that the phase shifting heater is supplied with electrical power P.

Back to FIG. 2, heater section 6 induced birefringence HIB—in short HIB6—can be compensated by heater section 7 induced birefringence HIB—in short HIB7.

In order to eliminate polarization issues in the thermo-optic control of the phase, it is preferred to leave the waveguide geometry as it is. Based on this, the following parameters are preferred ones within a heater section to be determined such that overall birefringence can be adjusted:

1. The heater material: By choosing materials with different thermal expansion coefficients, the stress field around the waveguide can be changed.
2. The heater width and thickness. A larger width and thickness of the heater will increase the influence on the stress in the waveguide area.
3. Trenches next to the heaters. Trenches allow the lateral stress field to relax, additional parameters are separation and depth of the trenches.

According to the VOA illustrated in FIG. 2, heater electrode 711 is wider than heater electrode 611. This difference in heater geometry—the heater geometry being one parameter out of many characterizing a heater section with regard to birefringence—might be sufficient for inducing positive birefringence in heater section 6 and negative birefringence in heater 7.

The VOA illustrated in FIG. 2 can be extended to a balanced Mach-Zehnder interferometer with heaters on both arms of the interferometer in order to generate a phase difference between the two arms via the thermo-optic effect. This will cause a gradual switching of the inserted light from one output to the other thus suppressing the light gradually in one of the outputs. At least two sets of heaters are put on both arms of the interferometer. Because the second sets of heaters are designed such that the polarization effect has the opposite sign to the first set and such that the ratio of polarization-dependent refractive-index change to overall refractive-index change differs from the first heater set, the amount of PDL can be controlled independently from the attenuation. Because the induced phase changes of the two heater sets actually add, no significant additional power is consumed by this modification.

Figure 1:
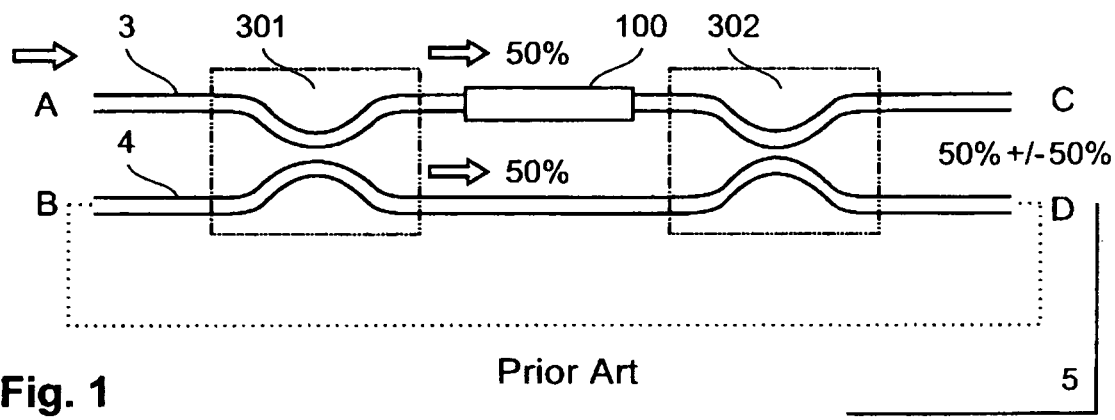
FIG. 1 a known intensity coupler.
Figure 3:
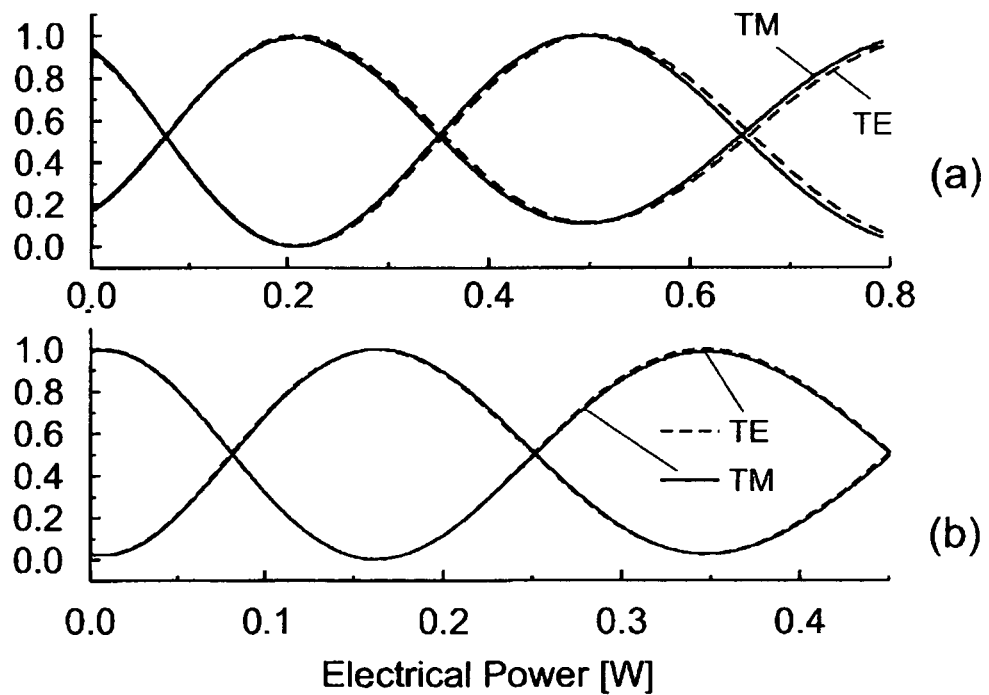

FIG. 3 illustrates the effect of two different HIB values.

FIG. 3a) shows normalized intensities of TE and TM polarization waves at the output of an VOA for different HIB values. In FIG. 3a), heater section induced birefringence HIB has a value of 2%. TE and TM wave tend to drift with increasing electrical heating power causing not satisfying attenuation results.

In FIG. 3b), HIB has a value of 0,3%.

As can be seen in FIG. 3b), introduction of balancing means reduce HIB and improve the overall attenuation characteristics of the VOA such that TE and TM waves nearly coincide even when high electrical heating power is provided.

FIGS. 4 to 9 give advice to someone skilled in the art how to adjust heater section parameters in order to cause positive or negative HIB values.

Figure 4:
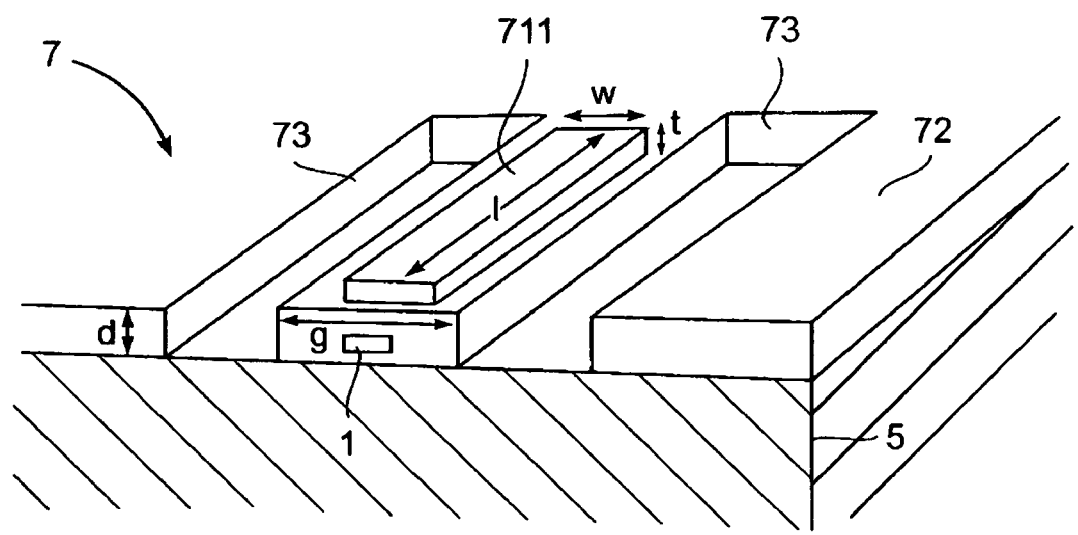

FIG. 4 illustrates an example of one of the heater sections, thereby introducing dimensions that are subject to variation in order to generate negative or positive HIB values. FIG. 4 shows a heater section 7, comprising a heater electrode 711. The heater electrode 711 is disposed on a cladding layer 72 which in turn is disposed on a substrate 5. A waveguide core 1 is embedded in the cladding layer 72. Thin-film heater electrode 711 has a length l that is oriented along the longitudinal axis of the waveguide core 1. Thin-film heater electrode 711 has a width w and a thickness t. Trenches 73 are arranged on both sides of the heater electrode 711. Trenches 73 have a height that corresponds to cladding layer thickness cl. Trenches 73 are separated by a gap g.

Figure 5:
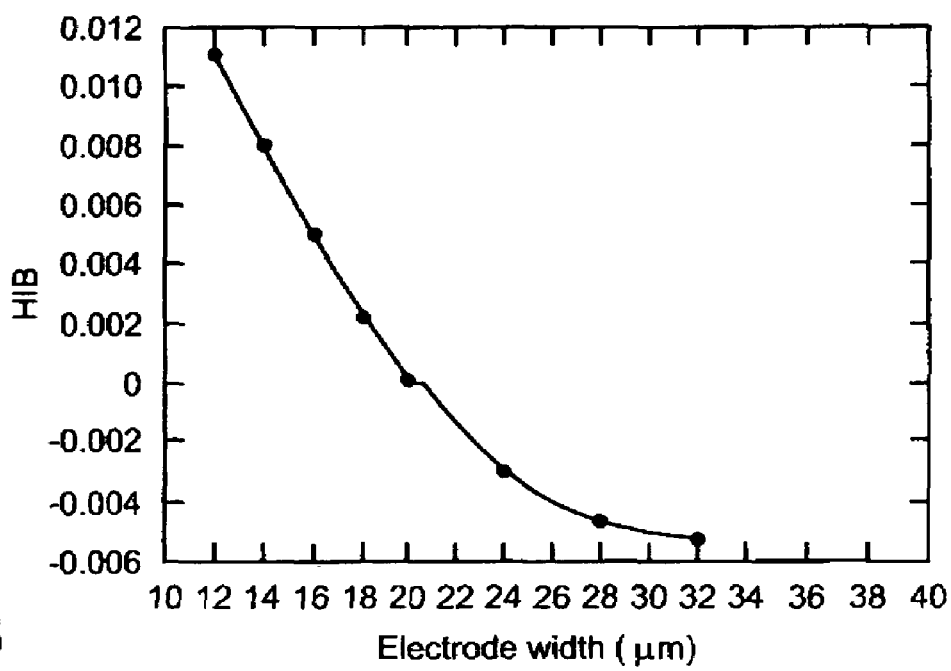

Using a 400 nm thick Cr electrode, it can be derived from FIG. 5, that in the absence of trenches, a positive, a zero or a negative HIB value van be obtained when varying the width of the heater electrode. In general, the wider this electrode is designed the more negative the HIB becomes. The shown curve can be shifted to the right when applying an offset to the heater section geometry, i.e. placing the longitudinal center line of the heater electrode not exactly on the longitudinal center line of the corresponding waveguide core but displacing electrode and waveguide by a center to center offset.

Figure 6:
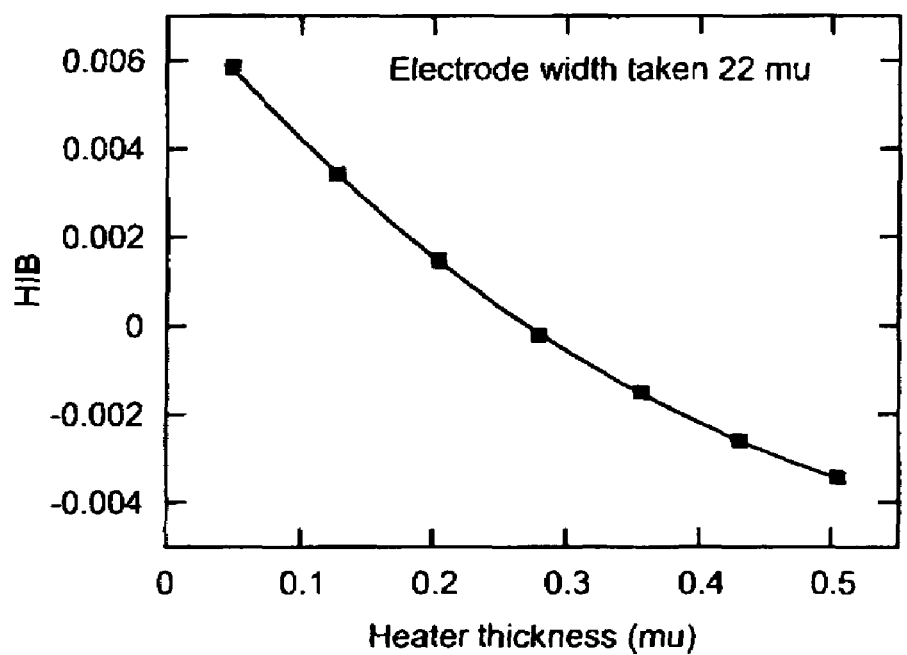

According to FIG. 6, HIB of a 22 mu wide Cr electrode is shown as a function of electrode thickness. It can be seen that over this large range of thickness the HIB varies an approximately 1%. If the thickness of this electrode would be 100 nm, the HIB would be approximately 0.3%. Therefore, smaller thickness requires a wider electrode in order to get an HIB of 0. Vice versa for wider thickness.

Figure 7:
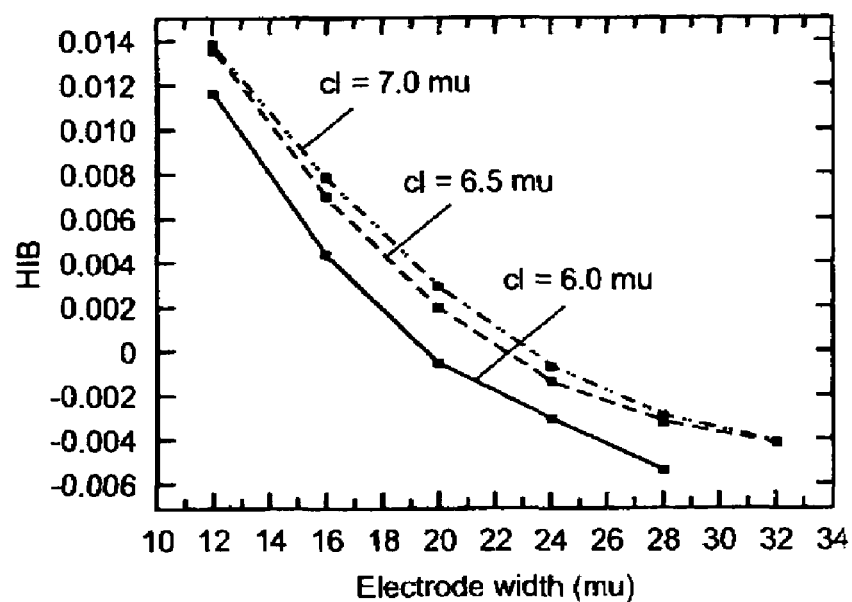

In the graph according to FIG. 7, the effect of variations in the cladding layer thickness cl is shown. The indicated thickness is taken as the thickness from the slab region to the top of the cladding layer. The graph shows the HIB value as a function of electrode width, with cladding layer thickness as parameter. A shift of 0.5 mu gives a raise in HIB of about 0.2%. No trenches are provided.

Figure 8:
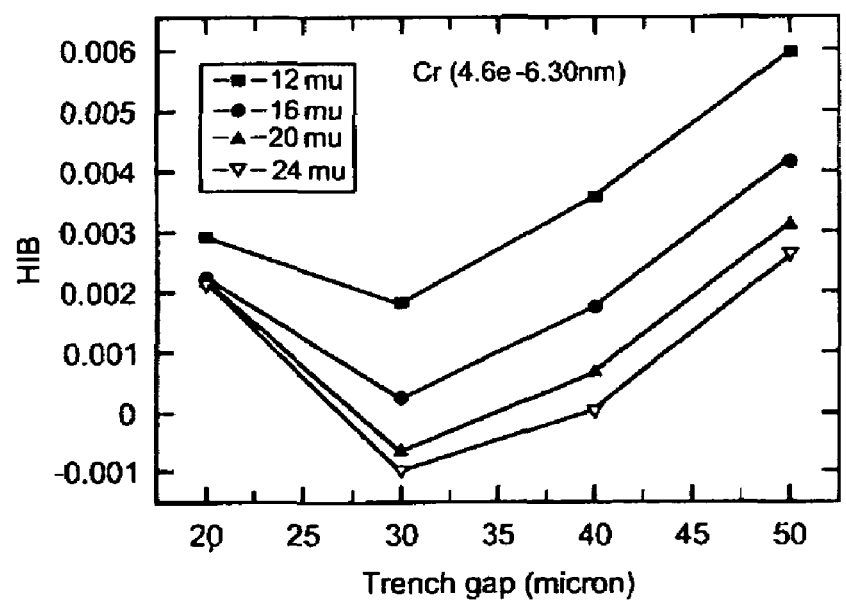

FIG. 8 shows a graph that clarifies the impact of trenches in heaters section geometry on the HIB when using a Cr electrode. HIB is shown as a function of trench gap. This is shown for four different electrode widths. The wider the gap, the more positive the HIB becomes.

Figure 9:
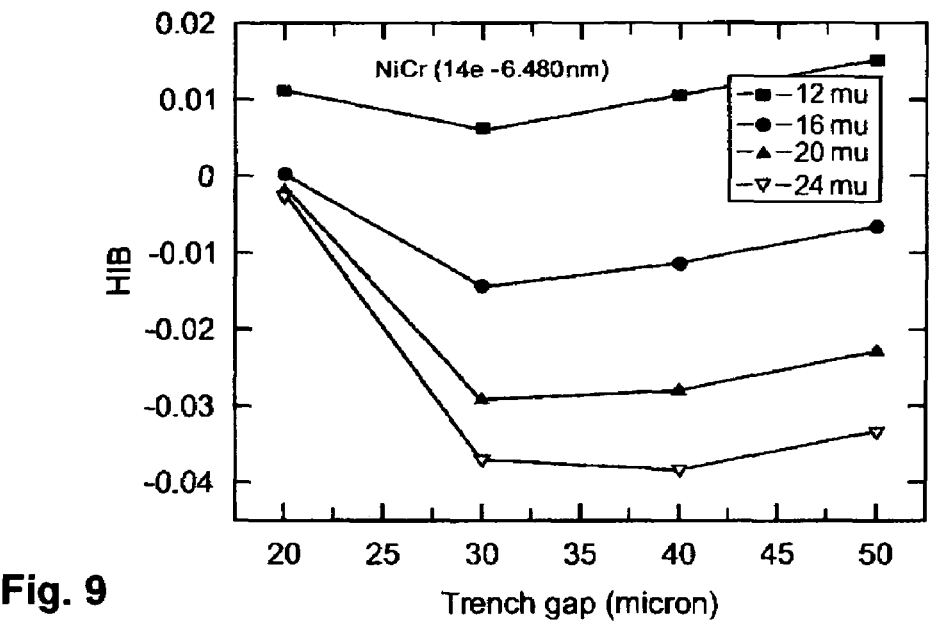

FIG. 9 shows the results of same simulations but using NiCr electrodes instead of Cr ones. NiCr generally tends to generate more negative HIB values than Cr electrodes, even without the provision of trenches.

Figure 10:
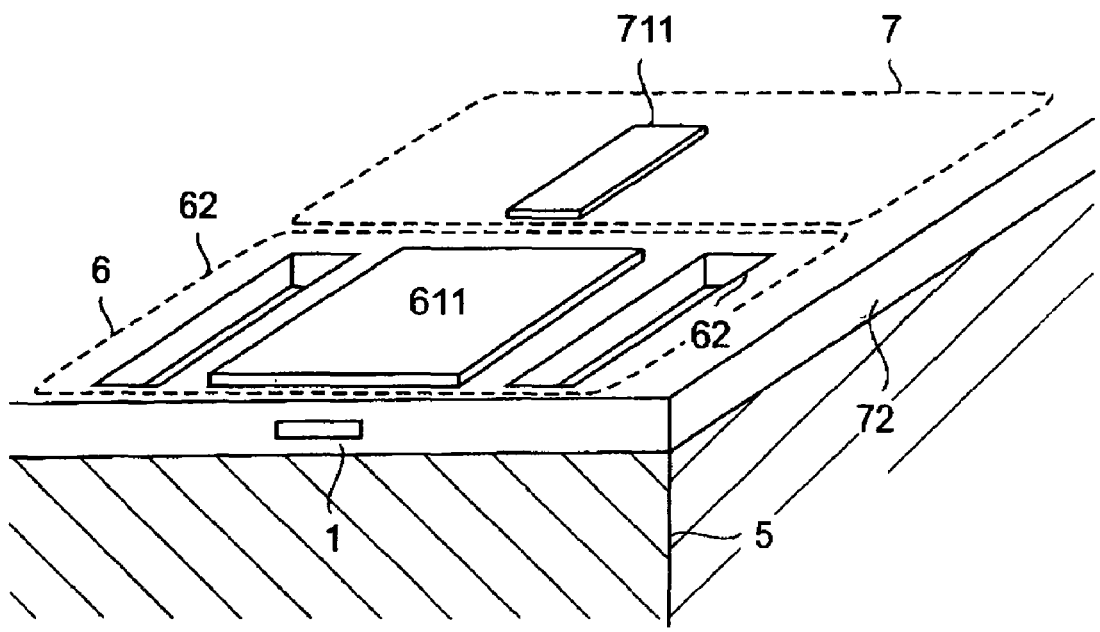

FIG. 10 shows a perspective view of a waveguide element according to an embodiment of the present invention. Two heater sections 6 and 7 are introduced with dotted lines. The first heater section 6 comprises a heater electrode 611 and two trenches 62 in parallel to and on both sides of the heater electrode 611. The second heater section 7 comprises a heater electrode 711. Heater electrode 611 is wider than heater electrode 711, while showing the same thickness. First heater section 6 causes a negative birefingence value since the heater section design including heater geometry and trenches causes more stress in the cladding layer in parallel to the major surface of the substrate 5, whereas second heater section 7 causes a positive birefringence value since heater section design including heater geometry causes more stress in the cladding layer perpendicular to the major surface of the substrate 5. In addition, the first heater electrode 611 might be heated with one third of overall electrical power whereas the second heater electrode 711 is heated with two thirds of electrical power. Overall electrical power is needed in order to achieve a predetermined phase shift. Partitioning of overall electrical power is also subject to impact on birefringence.

Figure 11:
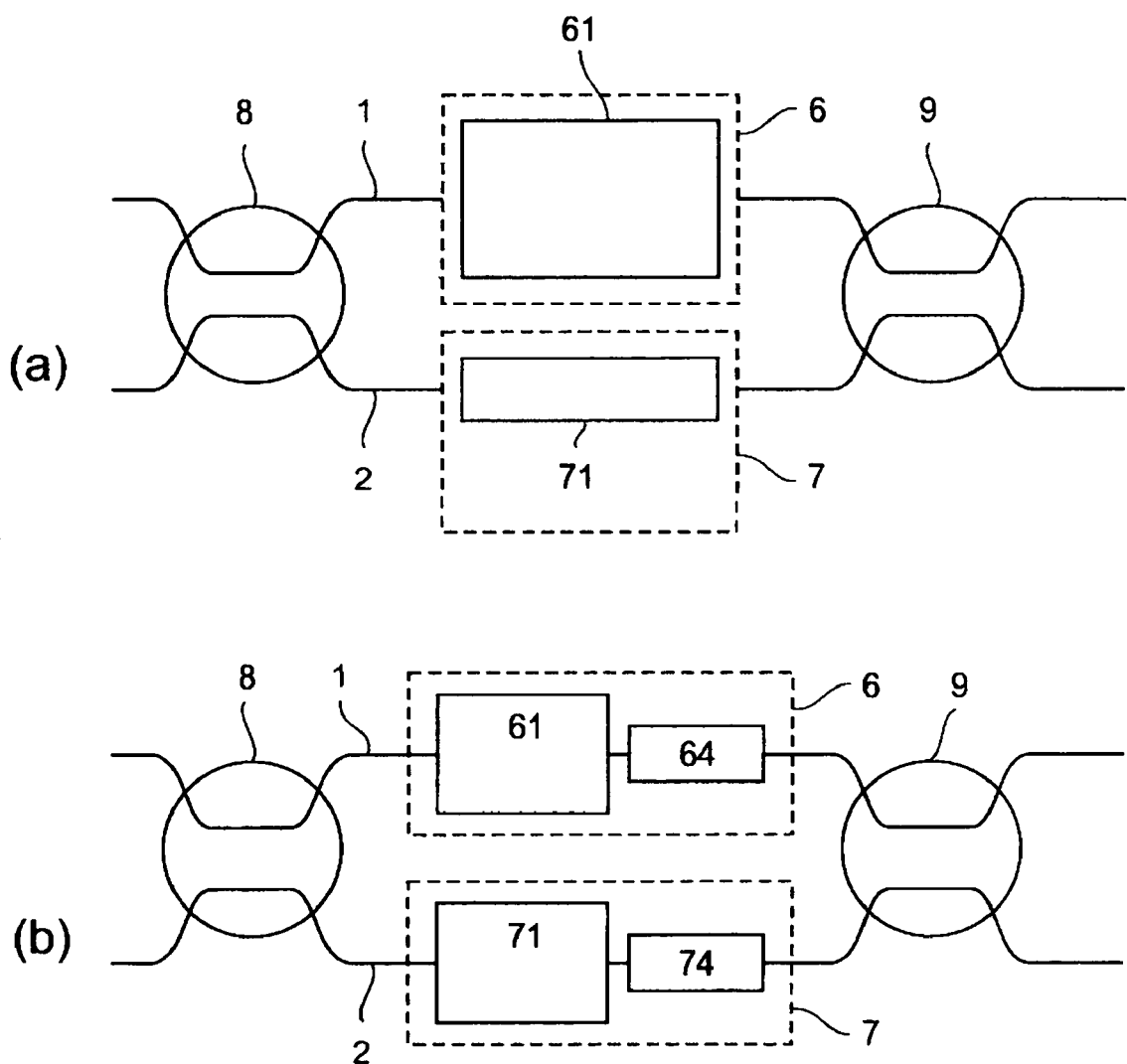
FIG. 11 different waveguide elements, in accordance with embodiments of the present invention.

FIG. 11 shows schematic views of waveguide elements, in accordance with embodiments of the present invention. FIG. 11a) and FIG. 11b) both illustrate waveguide elements that can be used as variable optical attenuators. Heaters are applied to both waveguides 1 and 2 that interconnect directional optical couplers 8 and 9.

In FIG. 11a), a heater section 6 acting on the first waveguide 1 comprises a wide heater 61. Heater section 7 is acting on the second waveguide 2 and comprises a second heater 71 that is less wide than heater 61. In this embodiment, heater sections 6 and 7 show different designs due to different heater widths. Hence, both heater sections cause a phase shift on signals in their respective waveguides, but show different HIB values. When driving heaters 61 and 71 with different power values, different phase shifts but similar HIB values—showing the same sign—might be accomplished with regard to optical signals in the two waveguides 1 and 2. By coupling these optical signals in optical coupler 9, birefringence can be turned to zero while intensity of the output signal is adjusted in accordance with the phase shifting means.

In FIG. 11b), the heater section 6 comprises two heaters 61 and 64, as well as heater section 7 which comprises two heaters 71 and 74. Different heaters associated to one heater section show different design. Heaters of different heater sections might also show different design, e.g. comprise different heater material.

The invention claimed is:

1. Optical waveguide element, comprising
   1) a cladding layer formed on a substrate,
   2) two optical waveguides formed in the cladding layer,
   3) first and second heater sections, each of said heater sections comprising a heater section on one of the waveguides for shifting a phase of an optical signal that is transmitted via the waveguide; and
   4) means to control, adjust, and balance overall birefringence, shift the phases of the optical signals transmitted via the waveguides and induce birefringence of opposite signs in each of said heater sections, said means comprising the first and second heater sections having different designs including:
      a) the first heater having a first material, and the second heater having a second material, where a thermal expansion coefficient of the first material is different from that of the second material;
      b) the first heater having a different width and thickness than that of the second heater, whereby a larger width and thickness of the heater increases the influence on the stress in the waveguide area;
      c) the first heater having trenches next the heater that are different from those of the second heater, whereby the trenches next to the heaters allow a lateral stress field to relax, and
      d) the trenches next to the first heater differ in separation and depth from the trenches next to the second heater; and
   5) two optical couplers being interconnected by the two waveguides.

2. Optical waveguide element according to claim 1 wherein both heater sections act on the same waveguide.

3. Optical waveguide element according to claim 1 wherein the optical couplers interfere with optical signals they are provided with.

4. Optical waveguide element, comprising
   1) a cladding layer formed on a substrate,
   2) a waveguide formed in the cladding layer,
   3) first and second heater sections, each of said heater sections comprising a heater section on the waveguide for shifting a phase of an optical signal that is transmitted via the waveguide; and
   4) means to control, adjust, and balance overall birefringence, shift the phases of the optical signals transmitted via the waveguides and induce birefringence of opposite signs in each of said heater sections, said means comprising the first and second heater sections having different designs including:
      a) the first heater having a first material, and the second heater having a second material, where a thermal expansion coefficient of the first material is different from that of the second material;
      b) the first heater having a different width and thickness than that of the second heater, whereby a larger width and thickness of the heater increases the influence on the stress in the waveguide area;
      c) the first heater having trenches next the heater that are different from those of the second heater, whereby the trenches next to the heaters allow a lateral stress field to relax, and
      d) the trenches next to the first heater differ in separation and depth from the trenches next to the second heater; and
   5) two optical couplers being interconnected by the waveguide.

5. Optical waveguide element according to claim 4 wherein one of the heater sections is induces birefringence with an opposite sign than the birefringence that is induced in the other heater section.

6. Optical waveguide element according to claim 4 wherein an electrode of the first heater is wider than an electrode of the second heater.

7. Optical waveguide element according to claim 4 wherein an electrode of the first heater is thicker than an electrode of the second heater.

8. Optical waveguide element according to claim 4 wherein only one of the heater sections comprises trenches in the cladding layer while the other heater section does not.

9. Optical waveguide element according to claim 4 wherein the material composition of an electrode of the first heater is different than the material composition of an electrode of the second heater.

10. Optical waveguide element according to claim 4 wherein a thermal expansion coefficient of an electrode metal of the first heater is greater than a thermal expansion coefficient of an electrode metal of the second heater.

11. Optical waveguide element according to claim 4 wherein the first and the second heater are supplied with different amounts of electrical power.

12. Optical waveguide element according claim 4 wherein at least one of the heaters comprises NiCr.

* * * * *